United States Patent [19]

Sato et al.

[11] Patent Number: 4,577,250
[45] Date of Patent: Mar. 18, 1986

[54] HALL EFFECT MAGNETIC HEAD

[75] Inventors: Kazuhiro Sato, Sagamihara; Katsuhiko Oguri, Fujisawa, both of Japan

[73] Assignee: Victor Company of Japan, Limited, Kanagawa, Japan

[21] Appl. No.: 448,564

[22] Filed: Dec. 10, 1982

[30] Foreign Application Priority Data

Dec. 18, 1981 [JP] Japan .................................. 56-203570
Dec. 19, 1981 [JP] Japan .................................. 56-204531
Dec. 28, 1981 [JP] Japan .................................. 56-193285

[51] Int. Cl.⁴ .................................................. G11B 5/38
[52] U.S. Cl. ...................................... 360/112; 360/121
[58] Field of Search .............................. 360/112–113, 360/121, 125–126, 123, 119

[56] References Cited

U.S. PATENT DOCUMENTS 3,146,317 8/1964 Kuhrt et al. ........................ 360/112

OTHER PUBLICATIONS

IBM/TDB, vol. 18, No. 12, May 1976, "Magnetic Films for Hall Effect Devices . . . ", by Gambino et al.

Primary Examiner—John H. Wolff
Attorney, Agent, or Firm—Jordan and Hamburg

[57] ABSTRACT

A Hall effect magnetic head performs predetermined operations such as recording, reproducing and erasing of data on a recording medium which is capable of magnetically recording data therein. The magnetic head includes first and second magnetic members which define therebetween a front gap which faces the recording medium, a space in which a magnetic field developing means is disposed, and a rear gap in which a Hall element is disposed. The Hall element is applied with a bias magnetic field developed by the magnetic field developing means and by a signal magnetic field developed by the recording medium. The Hall element comprises a vertically magnetizable thin layer or film and is caused to output as a Hall voltage a signal contained in the signal magnetic field. The front and rear gaps are adequately dimensioned to increase the Hall voltage. The magnetic head may include second magnetic field developing means for preventing the bias magnetic field from influencing the recording medium.

13 Claims, 11 Drawing Figures

HALL EFFECT MAGNETIC HEAD

BACKGROUND OF THE INVENTION

The present invention relates to a magnetic head for performing predetermined operations such as recording, reproducing and erasing of data on a magnetic recording medium which is capable of magnetically recording data therein, e.g. magnetic tape or magnetic disc. More particularly, the present invention relates to a magnetic head of the type which utilizes the Hall characteristic particular to a Hall element.

Magnetic heads have been extensively used in computers and other data processing apparatuses as well as in tape recorders, video tape recorders and like audio or video instruments. Typical examples are the magnetic heads used in connection with magnetic tapes, magnetic discs and magnetic drums.

There is an increasing demand in the art of data processing systems for the capability of processing a large amount of information within a short period of time. In the field of audio techniques, there has recently been introduced the PCM (pulse code modulation) system while, in the field of video techniques, video tape recorders have been widespread for use in homes. In such a current situation, a magnetic recording apparatus is required to have a larger storage capacity and be capable of recording data at higher density and reliability. This in turn requires a magnetic head installed in such an apparatus to be designed to attain higher output, data density, and reliability as well as lower cost. To meet this requirement, the industry has been successful in developing alternative magnetic heads as typified by an integrated head which is the small-sized and thin version of a conventional electromagnetic induction type magnetic head, a Hall head utilizing the Hall effect, and an MR head utilizing the magnetoresistance.

The thin film magnetic head comprises an annular thin layer or film serving as a pole piece and a thin layer or film wound on the pole piece to serve as a coil. A drawback inherent in this type of magnetic head is that the number of turns of the coil and, accordingly, the reproduction output in the low frequency range are limited. The MR head, such as a magnetic head for digital signal reproduction using a thin magnetic resistance element made of Ni-Fe alloy or the like, can be easily made small in size or integrated compared to the electromagnetic induction type magnetic head. Yet, the MR head requires a suitable magnetic shield due to the fact that the magnetosensitive surface of the resistance element lies within the plane of the film to thereby increase the magnetic resistance of the resulting magnetic path. The magnetic shield not only limits the characteristics of reproduction of the magnetic head in the high frequency range but results in an additional and intricate process for production, making it difficult to manufacture magnetic heads with good reproducibility. Meanwhile, the head using a Hall element constituted by a thin layer or film of InSb (indium antimonide) cannot attain the Hall effect unless the Hall element is at least 1-2 μm thick and, therefore, unless a rear gap accommodating the Hall element therein is wider than a front gap. This would increase the magnetic resistance of the rear gap and, thereby, lower the Hall output.

SUMMARY OF THE INVENTION

A Hall effect magnetic head embodying the present invention performs predetermined operations such as recording, reproducing and erasing of data on a recording medium which is capable of magnetically recording data therein. The magnetic head includes a first magnetic member and a second magnetic member located to face the first magnetic member. A front gap is defined between the first and second magnetic members, while a rear gap is defined between the first and second magnetic members and to the rear of the front gap. Further, a space is defined between the first and second magnetic members and dimensioned wider than each of the front and rear gaps. A Hall element is disposed in the rear gap. Means for developing a magnetic field within the rear gap is positioned in the space mentioned above.

In accordance with the present invention, a magnetic head includes first and second magnetic members which define therebetween a front gap which faces the recording medium, a space in which magnetic field developing means is disposed, and a rear gap in which a Hall element is disposed. The Hall element is applied with a bias magnetic field developed by the magnetic field developing means and by a signal magnetic field developed by the recording medium. The Hall element is constituted by a vertically magnetizable thin layer or film and caused to output as a Hall voltage a signal contained in the signal magnetic field. The front and rear gaps are adequately dimensioned to increase the Hall voltage. The magnetic head may include second magnetic field developing means for preventing the bias magnetic field from influencing the recording medium.

It is an object of the present invention to provide a magnetic head which achieves a sufficient output level during data reproduction and, accordingly, an excellent sensitivity in detection.

It is another object of the present invention to provide a magnetic head which is hardly effected by noise due to external magnetic fields without resorting to any special magnetic shield.

It is another object of the present invention to provide a magnetic head which readily enables a small-sized or multi-channel construction and promotes high density data recording by virtue of its improved degree of integration.

It is another object of the present invention to provide a magnetic head which minimizes the adverse influence of a bias magnetic field on a recording medium.

It is another object of the present invention to provide an economical magnetic head which can be integrated with ease.

It is another object of the present invention to provide a generally improved magnetic head.

Other objects, together with the foregoing, are attained in the embodiments described in the following description and illustrated in the accompanying drawings.

DESCRIPTION OF THE PREFERRED EMBODIMENTS

While the Hall effect magnetic head of the present invention is susceptible of numerous physical embodiments, depending upon the environment and requirements of use, substantial numbers of the herein shown and described embodiments have been made, tested and used, and all have performed in an eminently satisfactory manner.

Figure 1:
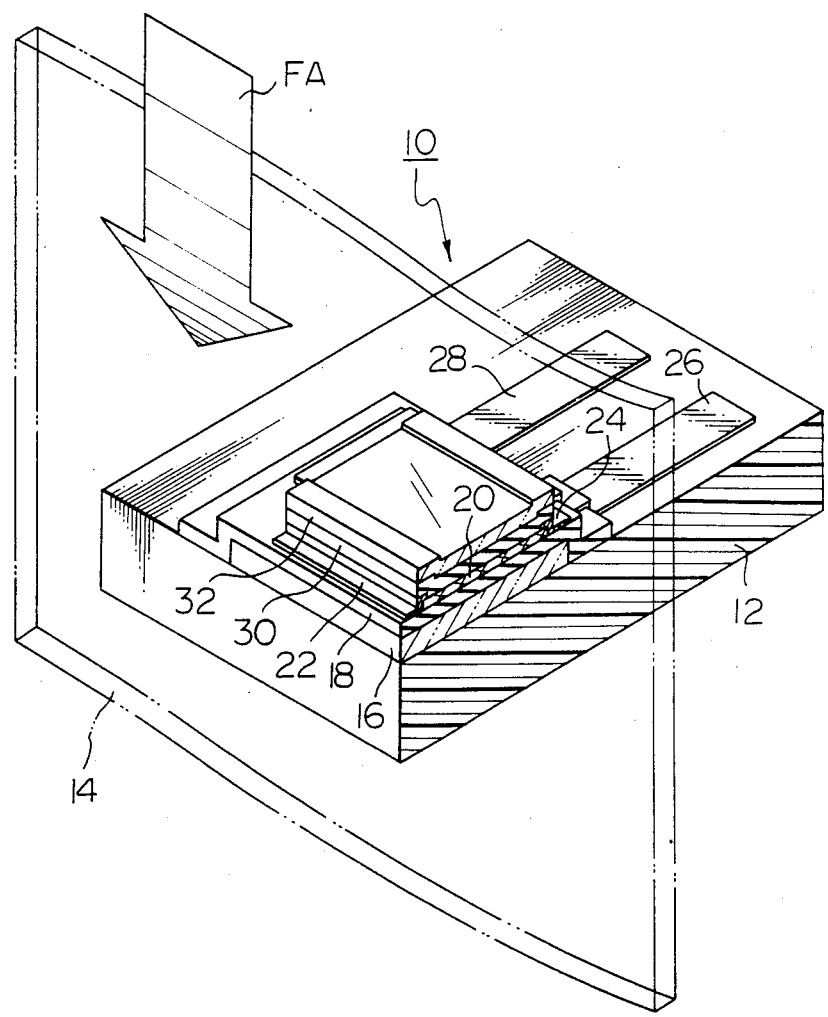
FIG. 1 is a perspective view of a basic construction of a magnetic head to which the present invention is applicable.

To facilitate understanding the present invention, a brief reference will be made to a basic construction of a magnetic head which uses a Hall element, depicted in FIG. 1. The magnetic head is generally designated by the reference numeral 10 and formed on a substrate 12. A recording medium 14 in the form of a magnetic recording tape is movable relative to the head 10 in the direction indicated by an arrow FA in the drawing. Only the left half of the head 10 is visible in the drawing, which shows the head 10 cut away, at an intermediate portion thereof. The right half (not shown) coacts with the left half.

The head 10 is located in an end portion of the substrate 12 which faces the moving magnetic tape 14. Deposited on the substrate 12 is a thin layer or film 16 made of a soft magnetic material such as Permalloy. A thin layer or film 18 of an insulating material is formed on the soft magnetic film 16. A Hall element 20 is formed on the insulating film 18. The Hall element 20 is constituted by a vertically magnetizable film of GdFe (gadolinium-iron compound) or GdCo (gadolinium-cobalt compound), for example. The Hall element 20 is provided with current electrodes (not shown) to be supplied with a current and Hall voltage pick-up electrodes 22 and 24. The Hall voltage electrode 24 is connected with a terminal 26 for connection with the outside of the head. One of the current electrodes is connected to a terminal 28. The other electrodes are connected to terminals at the right half of the magnetic head, although not shown in the drawing.

Deposited on the Hall element 20 is an insulating film 30 on which is deposited a film 32 of a soft magnetic material.

The magnetic flux developed by the magnetic tape 14 in the vicinity of the magnetic head permeates a portion having a low magnetic resistance, i.e. the soft magnetic films 16 and 32. Accordingly, the magnetic flux permeates the Hall element 20 perpendicular to the surface thereof. Because a current flows through the Hall element 20 at an angle of 90° to the magnetic flux, a Hall voltage is induced in a direction perpendicular to the directions of the magnetic flux and current. The Hall voltage is conducted by the electrode 22 to the terminal 26 and a terminal (not shown) so as to be fed to the outside. The Hall voltage corresponds to the recording magnetization of the magnetic tape 12 so that the data stored in the magnetic tape 12 is electrically reproduced by the head 10 and fed to the outside.

Figure 4A:
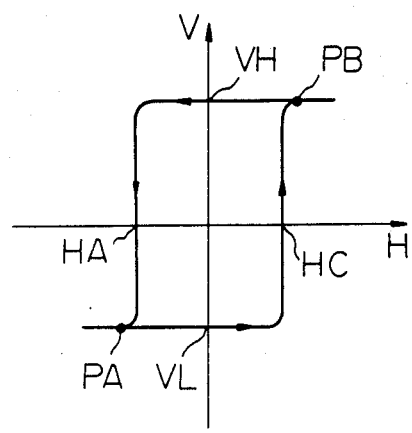
FIGS. 4a–4c are plots for explaining the operation of the magnetic head shown in FIG. 2.

The Hall element 20 which comprises a vertically magnetizable film as described, develops a Hall voltage V which shows a hysteresis characteristic relative to a magnetic field H applied thereto, as plotted in FIG. 4a by way of example. In FIG. 4a, the Hall voltage V takes either one of the values indicated by VH and VL. For example, supposing that a magnetic field HC is applied to the Hall element 20 which is in a state indicated by a point PA, the state of the Hall element 20 advances to point PB as indicated by an arrow in FIG. 4a so that the Hall voltage is varied from VL to VH. Thus, the direction of the magnetic field applied to the Hall element 20 is inverted and so is the polarity of the Hall voltage. The magnetic field HC or HA is usually regarded to exert a coercive force. When an inverted magnetic field larger in intensity than the magnetic field HC is applied to the Hall element 20, the polarity of the Hall voltage becomes inverted. The magnetic head of the present invention has been achieved utilizing such a characteristic of a Hall element.

Reference will be made to FIGS. 2-9 for describing a new and improved magnetic head embodying the present invention.

Figure 2:
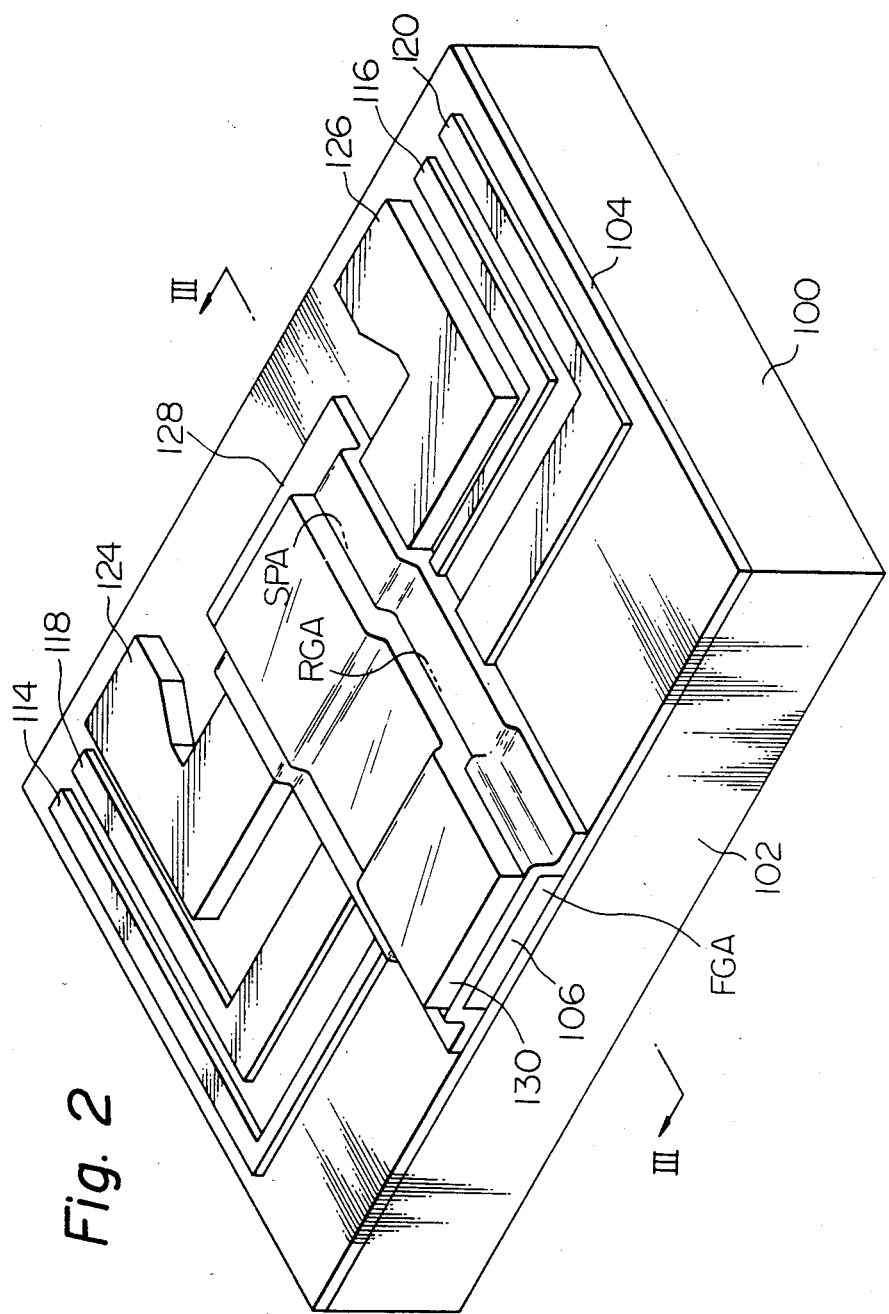
FIG. 2 is a perspective view of a magnetic head embodying the present invention.
Figure 3:
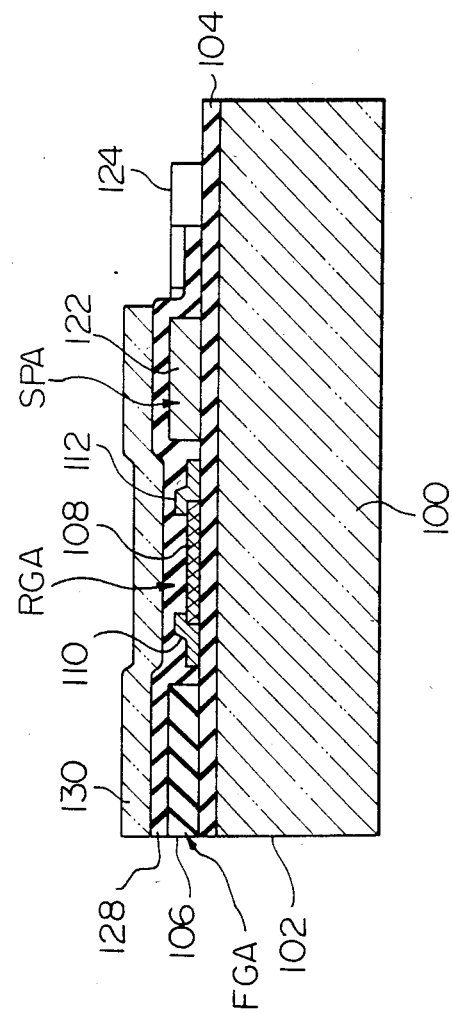
FIG. 3 is a section along a line III—III of FIG. 2.

Referring to FIGS. 2 and 3, a substrate 100 comprises a soft magnetic plate made of ferrite, Permalloy or the like and faces, for example, a magnetic tape at its end face 102. An insulating film 104 is formed over the entire top surface of the substrate 100 as by vacuum evaporation or chemical vapor deposition of $SiO_2$ (silicon oxide), $Si_3N_4$ (silicon nitride), $Al_2O_3$ (aluminum oxide) or the like.

The insulating film 104 has in its intermediate portion and adjacent to the end face 102 a thin layer or film 106 having a suitable area and adapted to define a front gap as will be described. The layer 106 may be formed of $SiO_2$, for example, and deposited by the same technique as employed for the deposition of the insulating film 104.

A Hall element 108 is constructed by a vertically magnetizable film of GdFe, GdCo or the like which is located to the rear of and at a suitable spacing from the film 106. Electrodes 110 and 112 are provided to the Hall element 108 and connected respectively to terminals 114 and 116, so that a Hall voltage induced in the Hall element 102 may be fed to the outside. Although not visible in the drawings, other electrodes are carried on the end face which is perpendicular to the end face carrying the electrodes 110 and 112. These invisible electrodes are respectively connected to terminals 118 and 120, functioning to allow a current to flow through the Hall element 108. All the electrodes and terminals mentioned are formed of metal such as Al, Cu-Cr or Au-Cr and by vacuum evaporation, electrodeposition or any other suitable method.

Located at the rear of the Hall element 108 is a conductive film 122 which serves as means for developing a bias magnetic field. The film 122 is connected with terminals 124 and 126 and formed by use of the same material and technique as in the case of the electrodes 110 and 112 and the like.

The film 106, electrodes 110 and 112 and conductive film 122 are insulated from each other by an insulating film 128 which covers them from above. The material and process for depositing the insulating film 128 are the same as those used for the insulating film 104 on the substrate 100.

The insulating film 128 is covered by a soft magnetic film 130 over its area extending from the position of the film 106 to the position of the conductive film 122. The soft magnetic film 130 may be made of Permalloy, or an alloy such as Ni-Fe or Fe-Al-Si alloy and by vacuum evaporation or electrodeposition, for example.

To demonstrate the correspondence between the magnetic head 100 and an ordinary magnetic head, the substrate 100 and soft magnetic film 130 correspond in combination to a magnetic core, the gap defined by the film 106 corresponds to an air gap in the magnetic core, and the conductive film 122 corresponds to a coil wound on the magnetic core.

A front gap FGA is defined by the film 106 between the soft magnetic film 130 and the substrate 100 adjacent to a recording medium. At the rear of the front gap FGA, a rear gap RGA is defined by the Hall element 108. Further, to the rear of the rear gap RGA, a space SPA is defined by the conductive film 122.

Figure 4B:
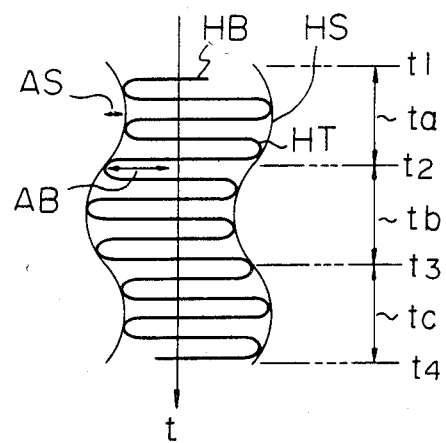
Figure 4C:
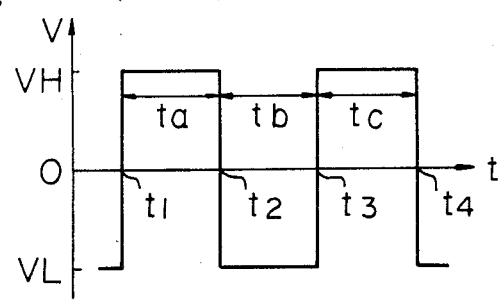

Referring to FIGS. 4a-4c as well, the operation of the magnetic head described above will be explained. The plots of FIGS. 4a-4c show the case of an a.c. bias system. In FIG. 4a which shows the characteristic of the Hall element 108, the abscissa indicates the magnetic field H and the ordinate the Hall voltage V. FIG. 4b shows the variation of the electric field applied to the Hall element 108 with respect to time t. FIG. 4c shows the variation of the Hall voltage picked up from the Hall element 108 with respect to time t.

An a.c. current is supplied from the outside to the conductive film 122 via the terminals 124 and 126. The frequency of this a.c. current is preferably selected to be at least five times the maximum frequency of a signal electric field developed by a recording medium. The current supplied to the conductive film 122 forms a magnetic flux which permeates the substrate 100 and reaches the soft magnetic film 130 through the Hall element 108. As a result, a magnetic flux is developed in the Hall element 108 substantially perpendicular to its surface. This results in a bias magnetic field HB for the Hall element 108 as indicated in FIG. 4b. In accordance with the present invention, the bias magnetic field HB has an amplitude AB which is smaller than that of the magnetic field HC shown in FIG. 4a.

When a signal magnetic field HS is applied to the magnetic head by a recording medium (not shown), it permeates the substrate 100 and soft magnetic film 130 to reach the Hall element 108 as the bias magnetic field HB has done. Thus, the Hall element 108 is effected by the composite magnetic field HT of the bias magnetic field HB and signal magnetic field HS. In FIG. 4, the signal magnetic field HS is assumed to have an amplitude AS.

At time $t_1$, the composite magnetic field HT is stronger than the magnetic field HC so that the Hall voltage V of the Hall electrode 108 reaches the level VH as indicated in FIG. 4c. This condition holds up to a time $t_2$, that is, the Hall voltage remains VH during time period $t_a$. At the time $t_2$, the composite electric field HT grows stronger than the magnetic field HA to invert the output of the Hall element 108 to the VL level. This VL Hall voltage is maintained for a time period $t_b$ up to a time $t_3$. Then, at the time $t_3$, the composite magnetic field HT again becomes stronger than the magnetic field HC and the Hall voltage is inverted to the VH level. This Hall voltage level VH continues throughout a time period $t_c$ up to a time $t_4$. In this manner, the magnetic field applied to the Hall element 108 is determined by the bias magnetic field HB such that the signal magnetic field HS does not vary far beyond the magnetic field HC or HA, which exerts the coercive force. The magnetic head, therefore, is capable of well converting even a subtle change in signal magnetic field into an electric signal due to the inversion of the Hall voltage, thereby accomplishing excellent sensitivity.

The amplitude HB of the bias magnetic field AB should not necessarily be smaller than the magnitude of the magnetic field HC. The gist is that the amplitude AS of the signal magnetic field should be larger than or equal to, for example, a threshold value $\Delta H = |AB-HC|$. The amplitude AB of the bias electric field HB is determined in such a manner as to satisfy such a condition.

Figure 5:
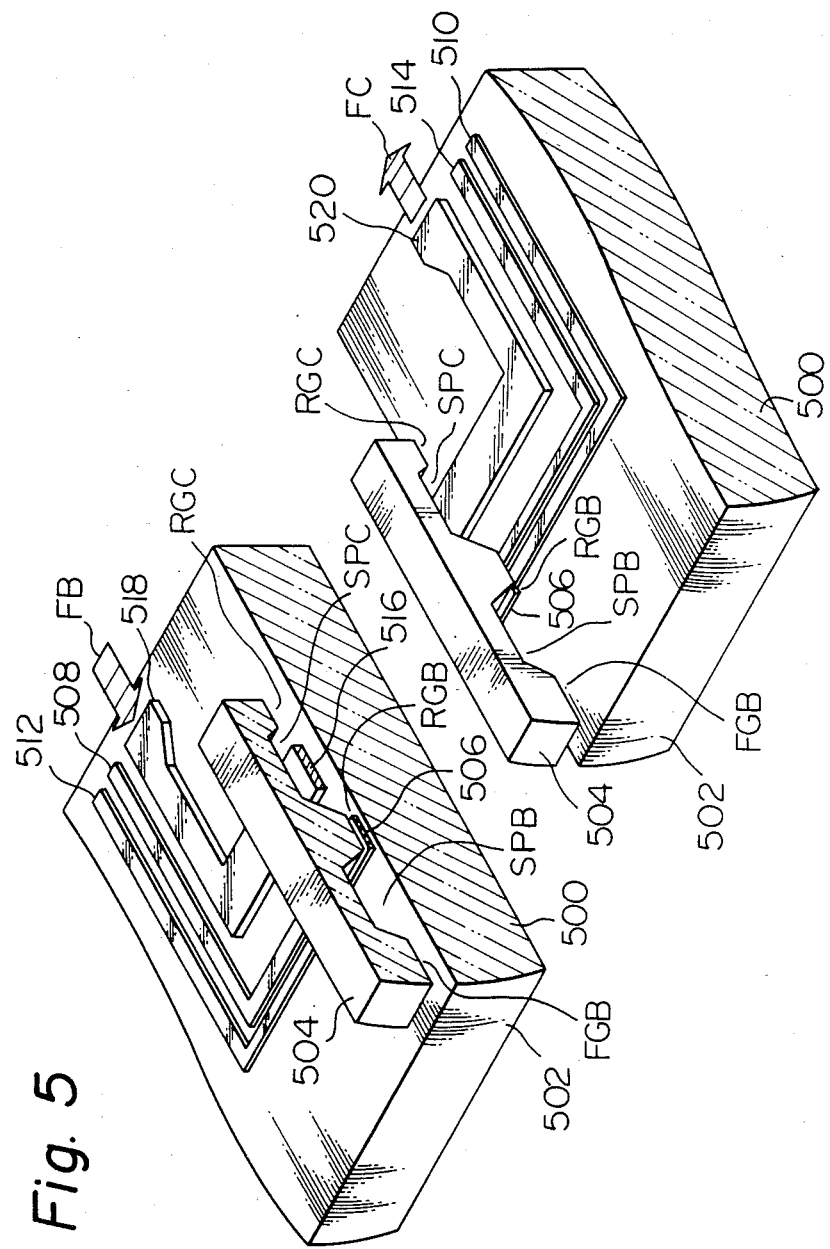
FIG. 5 is a perspective view of another embodiment of the present invention which is shown as being cut away at an intermediate portion thereof.

Referring to FIG. 5, another embodiment of the present invention is illustrated. In FIG. 5, the magnetic head is shown as being cut into two parts along its intermediate portion to facilitate understanding and only the major structural elements thereof are shown with the insulating films of FIG. 2 omitted. The magnetic head includes a magnetic core 500 provided with a magnetic core 504 in a central area of its top adjacent to an end face 502 which will oppose a recording medium (not shown) during operation. The magnetic cores 500 and 504 define therebetween a front gap FGB, first space SPB, first rear gap RGB, second space SPC and second rear gap RGC, in the order named from the side adjacent to the end face 502 of the magnetic core 500. The first rear gap RGB is dimensioned smaller than the front gap FGB so that the magnetic resistance of the first rear gap RGB is smaller than that of the front gap FGB. The second rear gap RGC, on the other hand, is dimensioned larger than the front gap FGB so that the magnetic resistance of the second rear gap RGC is larger than that of the front gap FGB.

Located in the first rear gap RGB is a Hall element 506 which is about 0.01–0.1 $\mu$m thick. The Hall element 506, like the Hall element 108 shown in FIG. 3, comprises a vertically magnetizable film which may be made of GdFe or GdCo, for example, and deposited by vacuum evaporation or sputtering. As in the embodiment shown in FIG. 2 or 3, the Hall element 506 is provided with current electrodes and Hall voltage electrodes which are respectively connected to terminals 508, 510, 512 and 514.

Disposed in the second space SPC is a conductor 516 which is connected to a terminal 518 at one end and to a terminal 520 at the other end. In this embodiment, the terminals 518 and 520 are formed integrally with the conductor 516 so that a current may flow from the terminal 518 to the terminal 520 as indicated by arrows FB and FC in the drawing. This current develops a magnetic field in the vicinity of the conductor 516 which acts on the Hall element as a bias magnetic field. The relationship between the bias magnetic field and the signal magnetic field formed by a recording medium described with reference to FIGS. 4a-4c holds true in the embodiment of FIG. 5 as well.

Figure 6:
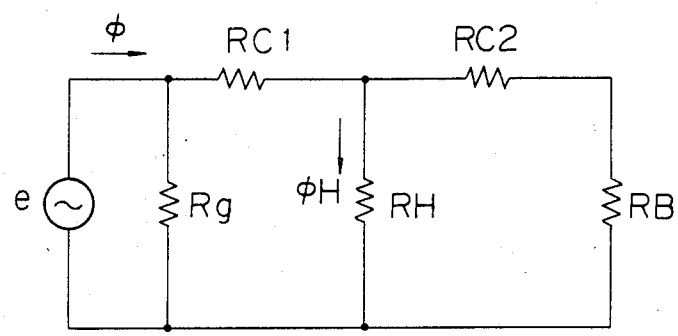
FIG. 6 is an equivalent magnetic circuit diagram representing the magnetic head shown in FIG. 5.

The structure shown in FIG. 5 may be represented by an equivalent magnetic circuit in relation with a signal magnetic field as shown in FIG. 6. The magnetomotive force e, which develops the signal magnetic field, corresponds to the electromotive force of an electric circuit and is indicated as a voltage source. The magnetic flux $\phi$ generated by the magnetomotive force e corresponds to the current in an electric circuit. Further, the magnetic resistances $RC_1$, $RC_2$, Rg, RH and RB correspond to the resistances in an electric circuit. Of these magnetic resistances, Rg, RH and RB are those of the front gap FGB, first rear gap RGB and second rear gap RGC, respectively, and are connected in parallel with the magnetomotive force e. The resistance $RC_1$ is the resistance of the magnetic cores 500 and 504 between the front gap FGB and the first rear gap RGB. Likewise, the resistance $RC_2$ is the resistance of the magnetic cores 500 and 504 between the first rear gap RGB and the second rear gap RGC. Thus, the resistance $RC_1$ is connected to the resistances Rg and RH while the resistance $RC_2$ is connected to the resistances RH and RB.

In the equivalent magnetic circuit described above, calculation for ordinary electric circuits is available to determine the magnetic flux $\phi H$ in the portion of the magnetic resistance RH which permeates the Hall element 506, as follows:

$$\phi H = \phi \cdot \frac{RC_2 + RB}{RH + RC_2 + RB} \cdot \frac{Rg}{Rg + RC_1 + \frac{RH(RC_2 + RB)}{RH + RC_2 + RB}} \quad (1)$$

Since in equation (1) each of the magnetic resistances $RC_1$ and $RC_2$ of the magnetic cores is negligibly small compared to the magnetic resistances Rg, RH and RB of the gaps FGB, RGB and RGC, the equation (1) may be modified as:

$$\phi H = \phi \cdot \frac{RB}{RH + RB} \cdot \frac{Rg}{Rg + \frac{RH \cdot RB}{RH + RB}} \quad (2)$$

Figure 7:
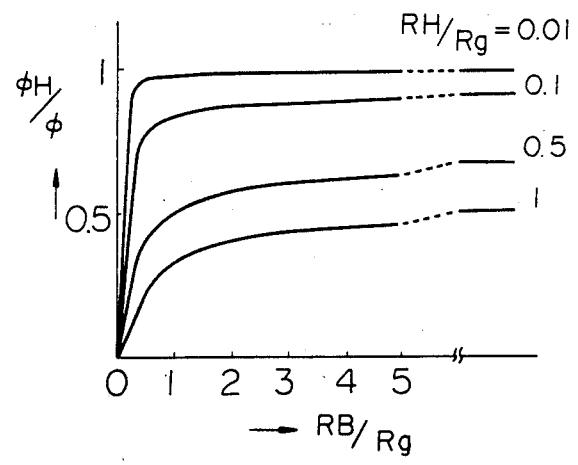
FIG. 7 is a graph indicating exemplary characteristics of the magnetic head shown in FIG. 5.

Equation (2) is represented by a graph in FIG. 7, in which the ordinate indicates $\phi H/\phi$, the abscissa RB/Rg and RH/Rg the parameter. It will be seen from the graph that the smaller the ratio RH/Rg, the larger the ratio $\phi H/\phi$ becomes. That is, as the magnetic resistance RH of the first rear gap RGB becomes lower than the magnetic resistance Rg of the front gap FGB, the magnetic flux component $\phi H$ of the signal magnetic field which permeates the Hall element 506 becomes more intensified to enhance the sensitivity of the magnetic head accordingly. Meanwhile, the magnetic resistance RH is lower than the magnetic flux Rg due to the fact that the Hall element 506 constituted by a vertically magnetizable film is located in the first rear gap RGB and the first rear gap RGB is dimensioned smaller than the front gap FGB. Thus, in this embodiment, almost all the components of the magnetic flux $\phi$ permeate the Hall element 506 so that the magnetic head has higher sensitivity.

Additionally, the magnetic flux of the bias magnetic field developed by the conductor 516 hardly affects the recording medium. This is because the magnetic flux concerned is passed through the first rear gap RGB whose resistance is small as already described, and is hardly allowed to pass through the front gap FGB.

In FIG. 7, the ratio $\phi H/\phi$ increases in proportion to the ratio RB/Rg. Stated another way, the magnetic flux $\phi H$ permeating the Hall element 506 increases as the magnetic resistance RB of the second rear gap RGC becomes higher than the magnetic resistance Rg of the front gap FGB. In practice, the magnetic resistance RB is at least ½ preferably one to two times, the magnetic resistance Rg. By so setting the magnetic resistance RB of the second rear gap RGC, the sensitivity of the magnetic head can be improved and even be maintained constant if inaccuracy exists in the dimensional accuracy of the front gap FGB. This promotes quantity production of such magnetic heads with improved reproducibility.

Figure 8:
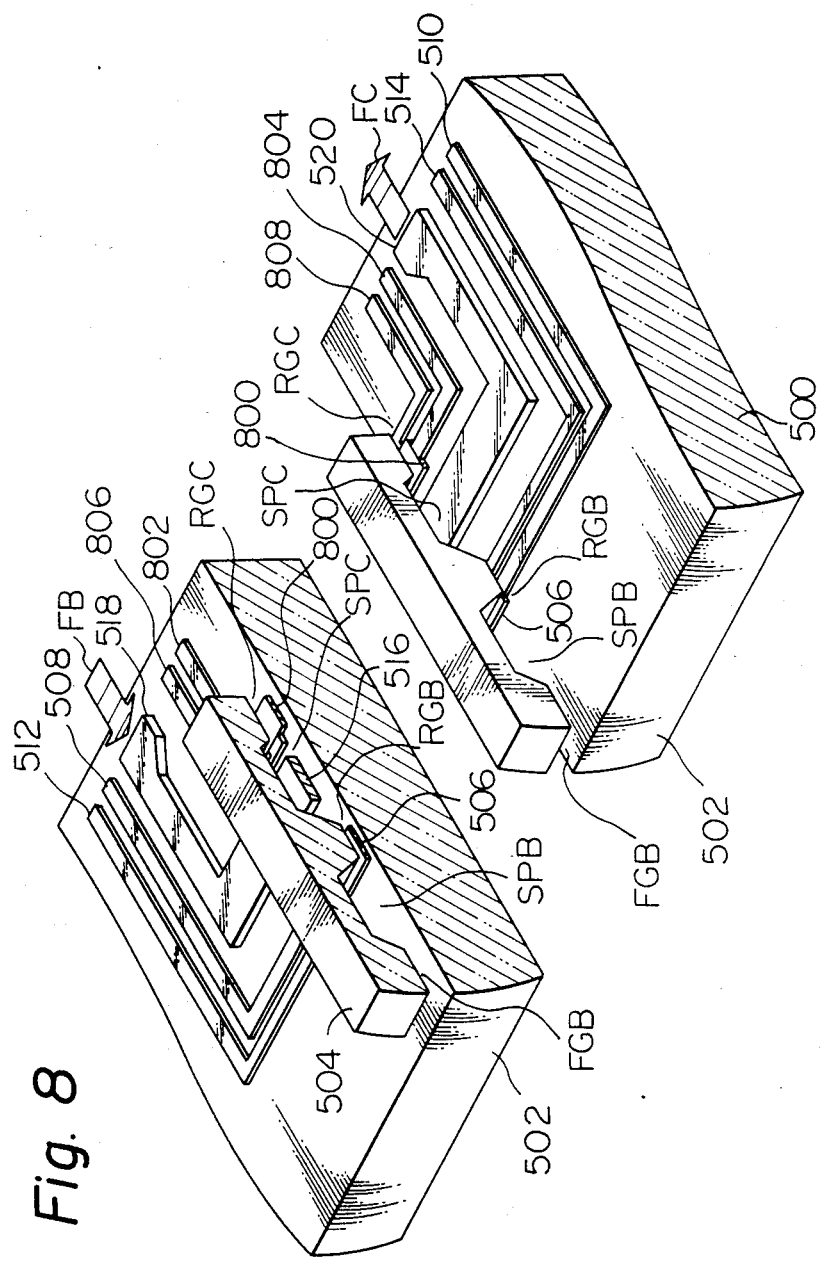
FIG. 8 is a perspective view of another embodiment of the present invention.

Referring to FIG. 8, another embodiment of the present invention is shown which is essentially similar to the embodiment of FIG. 5 and illustrated in the same manner as in FIG. 5. The difference is that, in FIG. 8, a second Hall element 800 is disposed in the second rear gap RGC in addition to the Hall element 506 in the first rear gap RGB. The Hall element 800, like the Hall element 506, is provided with current electrodes and Hall voltage electrodes which are respectively connected to terminals 802, 804, 806 and 808. The Hall element 800 comprises a vertically magnetizable film made of a material and deposited by a technique common to those employed for the Hall element 506.

With this arrangement, Hall voltages corresponding to a signal magnetic field are output from the Hall elements 506 and 800. The Hall voltages are picked up differentially through differential amplifiers or like circuit elements (not shown). The resulting signal will have been hardly effected by external noise.

Figure 9:
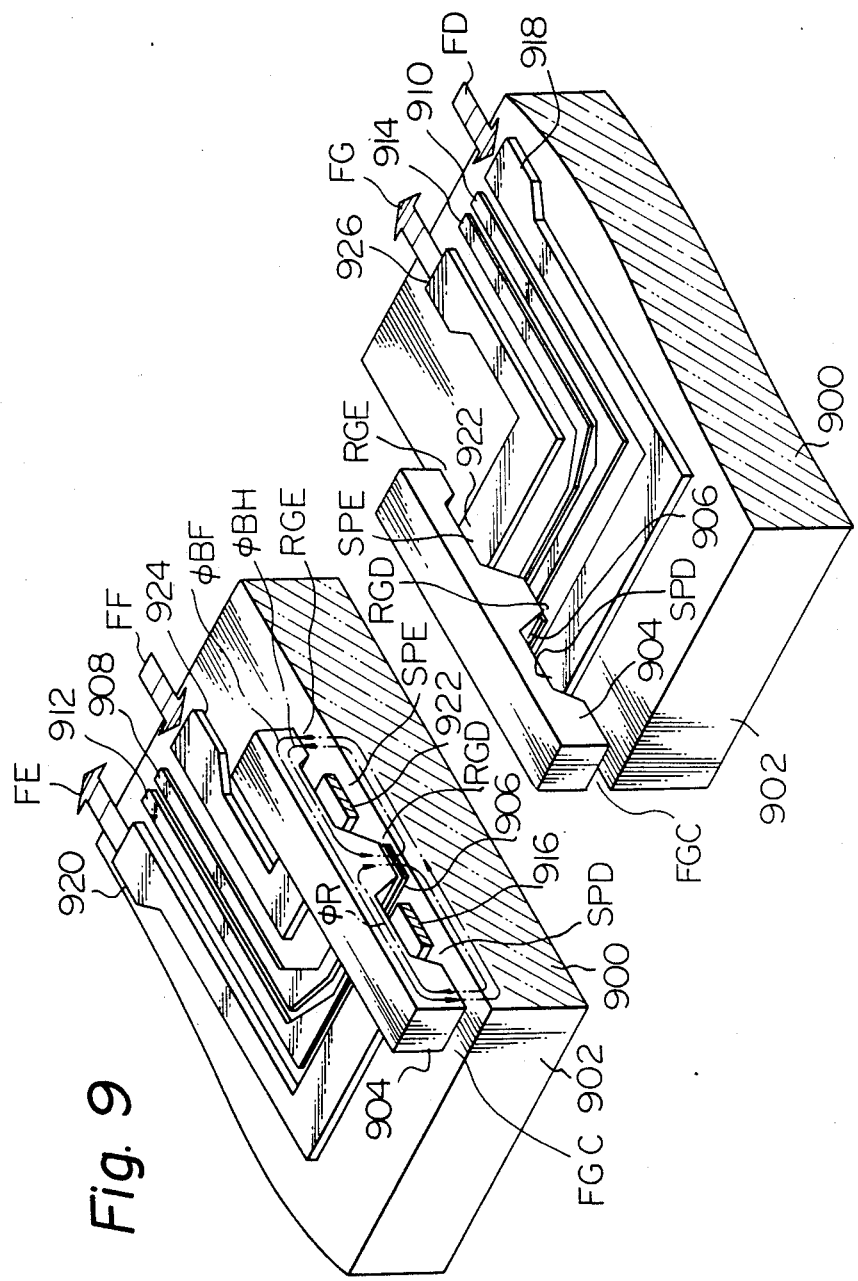
FIG. 9 is a perspective view of still another embodiment of the present invention.

Referring to FIG. 9, there is shown still another embodiment of the present invention which is elaborated to further effectively eliminate the adverse influence of the bias magnetic field on a recording medium. The magnetic head in FIG. 9 is illustrated in the same manner as the magnetic head shown in FIG. 5 or 8. As shown, the magnetic head includes a magnetic core 900 which carries a magnetic core 904 in a central area of its top adjacent to an end face 902 which will oppose a recording medium (not shown). Defined between the magnetic cores 900 and 904 are a front gap FGC, first space SPO, first rear gap RGD, second space SPE and second rear gap RGE, in the order named from the side adjacent to the end face 902. The first rear gap RGD is dimensioned smaller than the front gap FGC so that the magnetic resistance of the first rear gap RGC may be smaller than that of the front gap FGC. The second rear gap RGE is dimensioned larger than the front gap FGC and, accordingly, the magnetic resistance of the second rear gap RGE is larger than that of the front gap FGC.

A Hall element 906 which is about 0.01–0.1 μm thick is disposed in the first rear gap RGD. The Hall element 906, like the Hall element 108 shown in FIG. 3, comprises a vertically magnetizable film which may be made of GdFe or GdCo and formed by vacuum evaporation or sputtering. As in the embodiment of FIG. 2 or 3, the Hall element 906 is provided with current electrodes and Hall voltage electrodes which are respectively connected to terminals 908, 910, 912 and 914.

A conductor 916 is located in the first space SPD and connected to terminals 918 and 920. In this embodiment, the terminals 918 and 920 are formed integrally with the conductor 916 so that a current flows from the terminal 918 to the terminal 920 as indicated by arrows FD and FE in the drawing. Likewise, a second conductor 922 is disposed in the second space SPE and connected to terminals 924 and 926. Again, the conductor 922 constitutes an integral body with the terminals 924 and 926 which permits a current to flow from the terminal 924 to the terminal 926 as indicated by arrows FF and FG. Thus, the direction of current flow through the conductor 922 is opposite to the direction of current flow through the conductor 916.

The structure shown in FIG. 9 is essentially the same as the structure shown in FIG. 5 except for the conductor 916 and terminals 918 and 920, the functions of the various parts being also essentially the same. It should be noted in FIG. 9 that the hatching is partly omitted in the central sectioned surface of the magnetic core 900 and fully omitted in the central sectioned surface of the magnetic core 904. Instead, dot-and-dash lines are shown in those sectioned surfaces of the magnetic cores 900 and 904 to show the bias magnetic fluxes $\phi BF$ and $\phi BH$ developed by the current supply to the conductor 922 and the magnetic flux $\phi R$ developed by the current supply to the conductor 916.

In FIG. 9, when a current is supplied to the conductor 922 as indicated by the arrows FF and FG, there develops a bias magnetic flux $\phi BH$ which passes through the first and second rear gaps RGD and RGE and a bias magnetic flux $\phi BF$ which passes through the front gap FGC and second rear gap RGE. Inasmuch as the magnetic resistance of the first rear gap RGD is far smaller than that of the front gap FGC, the bias magnetic flux $\phi BF$ is far smaller than the bias magnetic flux $\phi BH$.

Thereafter, when a current is supplied to the other conductor 916 as indicated by the arrows FD and FE, a magnetic flux $\phi R$ is formed which passes through the front gap FGC and first rear gap RGD. The current supply to the conductor 916 occurs with the same frequency and phase as the current supply to the conductor 922 but opposite in direction to the latter. Hence, the magnetic flux $\phi R$ is directed opposite to the magnetic flux $\phi BF$ in the front gap FBC but common to the magnetic flux $\phi BH$ in the first rear gap RGD. In other words, the magnetic flux $\phi R$ cancels the bias magnetic flux $\phi B$ in the front gap FGC while being superposed on the bias magnetic flux $\phi BH$ in the first rear gap RGD. It follows that, if the value of the current fed to the conductor 916 is adequately selected, the magnetic field or flux in the front gap FGC can be fully cancelled to eliminate the influence of the bias magnetic field on a recording medium.

Although a magnetic flux also develops through the front gap FGC and second rear gap RGE, it will be understood that such a magnetic flux merely serves to cancel the magnetic flux formed in the second rear gap.

In summary, it will be seen that the present invention provides a magnetic head which is excellent in sensitivity and suitable for integration and enables small-sized construction and even a multi-channel arrangement. Besides, the magnetic head of the invention is free from the influence of noise caused by external magnetic fields or the influence thereof on a recording medium. For these reasons, the magnetic head is economical yet capable of coping with the current tendency to high density data recording.

Various modifications will become possible for those skilled in the art after receiving the teachings of the present disclosure without departing from the scope thereof. For example, while the magnetic field developing means has comprised thin layers or films in all the foregoing embodiments, it may be constructed by defining a front gap and a rear gap in an ordinary magnetic core, arranging a Hall element therein and winding a lead on the magnetic core. Generally, for a multi-channel magnetic head arrangement, a substrate or a magnetic core serving as a substrate will be structured common to all the magnetic heads. Furthermore, the number of the rear gaps is not limited to one or two but may be three or more. The magnetic material constituting the magnetic head may be hard Permalloy added with Ti or Si, Sendust alloy or amorphous material, if desired.

What is claimed is:

1. A Hall effect magnetic head for performing a predetermined operation such as recording, reproducing and erasing of data on a recording medium which is capable of magnetically recording data therein, comprising:
    a first magnetic member;
    a second magnetic member located to face said first magnetic member;
    the first and second magnetic members defining a front gap therebetween to face the recording medium;
    the first and second magnetic members further defining a rear gap therebetween to the rear of said front gap, the rear gap being made up of a first rear gap portion located to the rear of the front gap at a predetermined spacing therefrom and a second rear gap portion located to the rear of said first rear gap portion at a predetermined spacing therefrom;
    the first and second magnetic members further defining a space therebetween dimensioned wider than each of the front and rear gaps;
    a Hall element disposed in the rear gap; and
    means for developing a magnetic field within the rear gap, said means being positioned in said space.

2. A Hall effect magnetic head as claimed in claim 1, in which each of the first and second magnetic members comprises a thin layer or film of a soft magnetic material.

3. A Hall effect magnetic head as claimed in claim 1 or 2, further comprising an insulating member for insulating the first and second magnetic members from other structural elements of the magnetic head.

4. A Hall effect magnetic head as claimed in claim 1, in which the rear gap is narrower than the front gap.

5. A Hall effect magnetic head as claimed in claim 1, in which the first rear gap portion is narrower than the front gap and the second rear gap portion is wider than the front gap.

6. A Hall effect magnetic head as claimed in claim 5, in which the Hall element is disposed in the first rear gap portion.

7. A Hall effect magnetic head as claimed in claim 5, in which the Hall element is located in each of the first and second rear gap portions.

8. A Hall effect magnetic head as claimed in claim 6 or 7, in which the Hall element is constituted by a vertically magnetizable thin layer or film.

9. A Hall effect magnetic head as claimed in claim 1, in which said space is made up of a first space portion positioned between the front gap and the rear gap and a second space portion positioned to the rear of the rear gap.

10. A Hall effect magnetic head as claimed in claim 1, in which said space comprises a first space portion located between the front gap and the first rear gap portion and a second space portion located between the first and second rear gap portions.

11. A Hall effect magnetic head as claimed in claim 9 or 10, in which the magnetic field developing means is positioned in the second space portion.

12. A Hall effect magnetic head as claimed in claim 10, in which the magnetic field developing means comprises first magnetic field developing means located in the first space portion and second magnetic field developing means located in the second space portion, whereby a magnetic field developed by said second magnetic field developing means in the front gap is cancelled by a magnetic field formed by said first magnetic field developing means in the front gap.

13. A Hall effect magnetic head as claimed in claim 1 or 12 in which the magnetic field developing means comprises a conductor through which a current is to flow.

* * * * *